3,389,005
PROCESS FOR THE DECOMPOSITION OF ZIRCON SAND

Harry Kloepfer, Fritz Sperr, and Eugen Meyer-Simon, Frankfurt am Main, Germany, assignors to Deutsche Gold- und Silber - Scheideanstalt vormals Roessler, Frankfurt am Main, Germany
No Drawing. Filed May 1, 1963, Ser. No. 277,106
Claims priority, application Germany, May 8, 1962, D 38,861
6 Claims. (Cl. 106—299)

The present invention relates to an improved process for the decomposition of zircon sand (zirconium silicate) in which alkali metal oxides are used as the decomposing agents and in which compounds of zirconium are produced and especially such compounds which, similarly to the oxide hydrates, can be converted to zirconium oxide by calcining.

In addition to chlorinating and acidic decomposition of zircon sand, basic decompositions have also become known. Alkali metal hydroxides or alkali metal carbonates have been used exclusively for such basic decompositions. In such methods the zircon sand is mixed with the basic decomposition agent and the mixture heated until a fused mass is obtained. In some instances decomposition promoting additions such as sodium peroxide are employed in combination with the basic agents. In all instances it has been necessary to supply heat energy from an external source to maintain a fused state during the entire decomposition process.

According to the invention it was found that zircon sand could be decomposed without requiring the continuous supply of energy from an external source if an alkali metal oxide or a mixture of alkali metal oxides is used as the decomposing agent. Subsequent to such decomposition process the zirconium can be recovered in the form of its compounds, especially as the oxide or oxide hydrate.

Expediently the process according to the invention is carried out by warming a mixture of zircon sand and alkali metal oxide containing at least 1 mol of alkali metal oxide per mol of zircon sand to its ignition temperature and after the reaction has been completed processing the reaction mixture by digesting with water to remove solubilized $SiO_2$ values and if desired subsequent treatment with acids.

It was completely unexpected that the zircon sand could be quantitatively decomposed by this method which essentially involves reaction between solids. It is merely necessary to heat the mixture to ignition temperature, that is, a temperature of about 100–300° C., preferably about 200° C., in order to initiate the reaction. The heat energy required for the initiation of the reaction can be supplied by an electric or gas heated furnace. However, it is also possible to use an ignition pellet consisting of a mixture of $Na_2O$ and $SiO_2$ which can be ignited with an incandescent wire. The decomposition reaction which ensues is so strongly exothermic in all instances that it is self-propagating and that temperatures up to over 1000° C., occur in the decomposition mixture. After the completion of the decomposition reaction and after the decomposition mixture has cooled down it is digested with water by known procedures to free it of its soluble components such as sodium silicate.

As has already been indicated above, at least 1 mol of alkali metal oxide must be employed per mol of zircon sand. The upper limit of the quantity of alkali metal oxide is only dictated by considerations of economy. As differences in the composition of the decomposition products occur in dependency upon the quantity of alkali metal oxide used, it is expedient to take such differences into consideration when the resulting decomposition mixtures are processed. Expediently, in the process according to the invention, starting mixtures are employed which contain about 1.5 to about 4 mol and preferably about 2 to 3 mol of alkali metal oxide per mol of zircon sand. After the decomposition mixture has been digested with water to remove the solubles the remaining insoluble zirconium oxide hydrate can be purified by treatment with dilute mineral acid. When starting mixtures containing the indicated preferred proportions of alkali metal oxide are employed, the entire silica content of the zircon sand is converted to water soluble alkali metal silicate whereas upon digestion of the decomposition mixture with water the zirconium remains as insoluble zirconium oxide hydrate. After the extraction of the alkali metal silicate, which advantageously is effected with water, and preferably softened, that is, calcium free, water, a zirconium oxide hydrate containing about 2% of alkali metal oxide and about 2% of silica remains as the residue. Upon subsequent treatment of such residue with dilute mineral acids which, for example, can be carried out at a pH of about 5–6 the alkali content is reduced to about 0.1% and the silica content to about 0.5%. The process according to the invention therefore renders it possible to decompose zircon sand in a very simple manner. The zirconium oxide hydrate is obtained in yields of over 98% based on $ZrO_2$. This product can be dried in a known manner at 150° C. or it can be calcined at temperatures of, for example, about 900° C. to produce water free zirconium oxide.

It also is possible to dissolve the zirconium oxide hydrate in a mineral acid, such as HCl or $H_2SO_4$, of a concentration of over 10% and to reprecipitate the zirconium as zirconium sulfate, basic zirconium sulfate or zirconium oxide by introducing ammonium hydroxide or ammonia gas. The products thus attained are marked by their especially high purity. The basic zirconium sulfate can be converted to zirconium oxide by thermal decomposition.

When starting mixtures are employed only containing about 1 to about 2 mol, preferably about 1.5 mol, of alkali metal hydroxide per mol of zircon sand the reaction can be initiated and proceeds much in the same manner as described above. However, the reaction product after extraction with water yields a residue which in addition to zirconium oxide hydrate contains a quantity of alkali metal zirconium silicate and residual undecomposed zircon sand in quantities of 5 to 10%. The quantity of alkali metal zirconium silicate increases the nearer the ratio of the alkali metal oxide employed approaches 1 mol per mol of zircon sand. When such lower quantities of alkali metal oxide are employed about 90% of the zircon sand is converted to zirconium oxide and alkali metal zirconium silicate. In processing the insoluble residue remaining after the reaction product has been extracted with water, it is expedient to dissolve such residue in a mineral acid, preferably $H_2SO_4$ or HCl of a concentration over 10%, separate off the insolubles and to precipitate zirconium acid hydrate or basic zirconium sulfate from the solution with ammonia. These products can be converted to water free zirconium oxide as has already been indicated above.

In the last modification of the process according to the invention it is also possible to heat the decomposition mixture, preferably, after previous extraction with water, with ammonium sulfate at high temperatures, preferably at about 850° C. and to leach out the resulting product with water. The reaction with ammonium sulfate leads to a mixture of sodium sulfate, zirconium oxide and silica. The water leach removes the sodium sulfate. The remaining zirconium oxide-silica mixture can be directly used for various products such as, for example, in the production of ceramic pigments.

In all of the procedures it has been found expedient to use softened water and especially calcium free water.

The following examples illustrate the invention with reference to several embodiments thereof.

Example 1

2.52 kg. of zircon sand (66% $ZrO_2$ content) were well mixed with 2.56 kg. of ground technical $Na_2O$ (molar ratio $Na_2O:ZrSiO_4=3:1$) and placed in a reaction crucible. The charged crucible was heated in an electric furnace. When the temperature of the charge reached 200° C. it ignited and in view of the resulting strong exothermic heat of reaction further supply of heat was unnecessary. The temperature of the reaction mixture during the progress of the reaction rose to about 1100° C. After the reaction mixture had cooled down, the somewhat sintered together regulus was broken up into smaller pieces and introduced into 10 liters of hot water which had been softened over an ion exchange agent and digested at about 70° C. The sodium silicate formed dissolved out and zirconium oxide hydrate remained as solid residue. The solid residue was digested with a further quantity of water whereupon the greatest quantity of sodium silicate had been removed. The remainder of the sodium silicate can be washed out with hot water during the subsequent filtration. The zirconium oxide hydrate obtained still contained about 2% of alkali and about 2% of $SiO_2$. The yield of zirconium oxide hydrate was 1.93 kg. (dried at 150° C.) and therefore over 98%. The loss on ignition of such product was about 15%.

In order to purify the product further it was again slurried in 2 liters of water and the pH of such slurry adjusted to 6 with HCl. After subsequent filtration a zirconium oxide hydrate of the following composition was obtained:

$$ZrO_2=84\%;\ SiO_2=0.25\%;\ Na_2O=0.10\%$$

Loss on ignition thereof was 15.9%.

Practically no losses in $ZrO_2$ occurred in such purification.

Substantially the same results were obtained when the reaction in the starting mixture of zircon sand and sodium oxide was initiated with an ignition pellet consisting of a mixture of $SiO_2$ and $Na_2O$ in a molar ratio of 1:2 which was ignited with the aid of an incandescent metal rod.

Example 2

1.28 kg. of ground technical $Na_2O$ and 2.52 kg. of zircon sand (molar ratio $Na_2O:ZrSiO_4=1.5:1$) were mixed and ignited in an electric furnace as described in Example 1. After the reaction initiated the temperature of the reaction mixture rose to about 1000° C. After the reaction mixture had cooled down the sodium silicate formed was extracted with hot softened water. In view of the lower quantity of $Na_2O$ used, only a portion of the $SiO_2$ originally contained in the $ZrSiO_4$ was converted to sodium silicate which could be washed out. The remainder says with the insolubles as $Na_2ZrSiO_5$ or undecomposed $ZrSiO_4$. The insolubles remaining after the extraction with water and filtration were then stirred with 2.5 liters of about 33% hot $H_2SO_4$ whereby $ZrO_2$ and $NaZrSiO_5$ were dissolved and an undissolved residue of $SiO_2$ (from the $NaZrSiO_5$) and undecomposed zircon sand remained which were filtered off. Zirconium oxide hydrate was precipitated from the resulting $Zr(SO_4)_2$ by the introduction of ammonia and filtered off. After it was well washed with distilled water and dried at 150° C. 2.1 kg. of zirconium oxide hydrate were obtained which only contained traces of $SiO_2$ and had a 28% loss on ignition.

We claim:

1. A process for recovery of zirconium values from zircon sand which comprises heating a mixture of finely divided sodium oxide and zirconium sand containing at least 1 mol of sodium oxide per mol of zircon sand to a temperature between about 100 and 300° C. to ignite said mixture and initiate a self-propagating reaction and permitting said self-propagating reaction to go to completion without further supply of heat from an external source, after completion of the reaction extracting the reaction mixture with water to leave an insoluble residue containing zirconium values.

2. The process of claim 1 in which the molar ratio of sodium oxide to zirconium sand in said starting mixture is about 1.5 to about 4 mols of sodium oxide per mol of zircon sand.

3. The process of claim 1 in which the molar ratio of sodium oxide to zirconium sand in said starting mixture is about 2 to about 3 mols of sodium oxide per mol of zircon sand.

4. The process of claim 1 comprising in addition treating the insoluble residue containing zirconium values with a mineral acid selected from the group consisting of $H_2SO_4$ and HCl of a concentration higher than 10% to dissolve such zirconium values and precipitating zirconium values from the resulting solution with ammonia.

5. The process of claim 1 in which the molar ratio of sodium oxide to zircon sand is about 1 to 2 mols of sodium oxide per mol of zirconium sand and comprising in addition treating the insoluble residue containing zirconium values with a sufficient quantity of ammonium sulfate at sufficiently high temperatures that a product essentially consisting of $SiO_2$, $ZrO_2$ and sodium sulfate results and extracting the sodium sulfate from such product with water.

6. The process of claim 1 in which soft calcium free water is employed for the extraction.

References Cited

UNITED STATES PATENTS

| 1,454,564 | 5/1923 | Ruff | 23—24.1 |
| 1,609,826 | 12/1926 | Kinzie | 23—24.1 |
| 2,696,425 | 12/1954 | Kistler | 23—140 |

OTHER REFERENCES

Beyer et al.—"U.S. Atomic Energy Commission Report"—ISC—437 (Rev.), August 1954, 15 pages (pp. 12–14 of particular interest).

OSCAR R. VERTIZ, *Primary Examiner.*

H. T. CARTER, *Assistant Examiner.*